United States Patent [19]

Carlson et al.

[11] Patent Number: 5,310,588

[45] Date of Patent: May 10, 1994

[54] HIGH TEMPERATURE SEALANT CONTAINING PHENYL SILICONE

[75] Inventors: Brian W. Carlson, Woodbury; Brian S. Glasbrenner, Brooklyn Park, both of Minn.

[73] Assignee: H. B. Fuller Licensing & Financing Inc., Wilmington, Del.

[21] Appl. No.: 744,538

[22] Filed: Aug. 13, 1991

[51] Int. Cl.$^5$ .................... B65D 53/00; C08G 77/04
[52] U.S. Cl. .................................. 428/40; 428/194;
428/325; 428/328; 428/329; 428/331; 428/343;
428/349; 428/355; 428/356; 428/425.5;
428/447; 428/448; 428/449; 428/451; 524/14;
524/401; 524/434; 524/437; 528/24
[58] Field of Search ............... 428/40, 794, 343, 349,
428/355, 356, 425.5, 447, 448, 449, 451, 328,
329, 331, 325; 264/511; 528/24; 524/14, 437,
434, 401, 588, 860

[56] References Cited

U.S. PATENT DOCUMENTS

| | | | |
|---|---|---|---|
| 3,032,438 | 5/1962 | Gaynes et al. | 117/76 |
| 3,202,535 | 8/1965 | Gaynes | 428/447 |
| 3,527,842 | 9/1970 | Clark | 260/825 |
| 3,819,563 | 6/1974 | Takago et al. | 260/37 SB |
| 3,853,805 | 12/1974 | Miller et al. | 260/37 SB |
| 4,169,185 | 9/1979 | Bhatia | 428/328 |
| 4,835,060 | 5/1989 | Kosiarski et al. | 428/447 |
| 4,839,206 | 6/1989 | Waldenberger | 428/40 |
| 5,010,883 | 4/1991 | Rawlings | 428/220 |
| 5,026,766 | 6/1991 | Sasaki | 524/588 |
| 5,129,813 | 7/1992 | Shepherd | 428/167 |
| 5,162,407 | 11/1992 | Turner | 428/447 |

OTHER PUBLICATIONS

Hawkeye Ent., Inc. "Vacuum Bagging/Stacking Sequence".

*Primary Examiner*—Ellis P. Robinson
*Assistant Examiner*—Nasser Ahmad
*Attorney, Agent, or Firm*—Merchant, Gould, Smith, Edell, Welter & Schmidt

[57] ABSTRACT

A sealant for use at temperatures greater than about 700° F. may be formed from:

(a) about 40 to 90 wt-% of a silicone having a molecular weight of about 10,000 to 10,000,000 and repeating units comprising:

(i) about 1 to 20 mole-% of units having the formula:

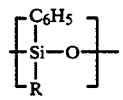

wherein R comprises —H, a $C_{1-5}$ alkyl group, a $C_{1-5}$ fluoroalkyl group, a vinyl group or a phenyl group and (ii) about 99 to 80 mole-% of units having the formula:

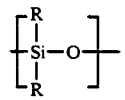

wherein each R independently comprises —H, a $C_{1-5}$ alkyl group, a $C_{1-5}$ fluoroalkyl group, a vinyl group, or a phenyl group; and (b) about 1 to 10 wt-% of a thermal stabilizer;
(c) about 0.1 to 2 wt-% of a curing agent; and
(d) about 0 to 50 wt-% of an inorganic filler;

wherein the composition remains an effective sealant at temperatures above about 700° F. The sealant may be used to bond and seal a barrier film or vacuum bag to a forming tool in autoclave curing and processing of thermosetting and thermoplastic composites. When cured, the sealant exhibits excellent sheer strength and is useful at temperatures greater than about 700° F.

Further, the sealant may be disposed on a release-lined backing sheet.

13 Claims, 1 Drawing Sheet

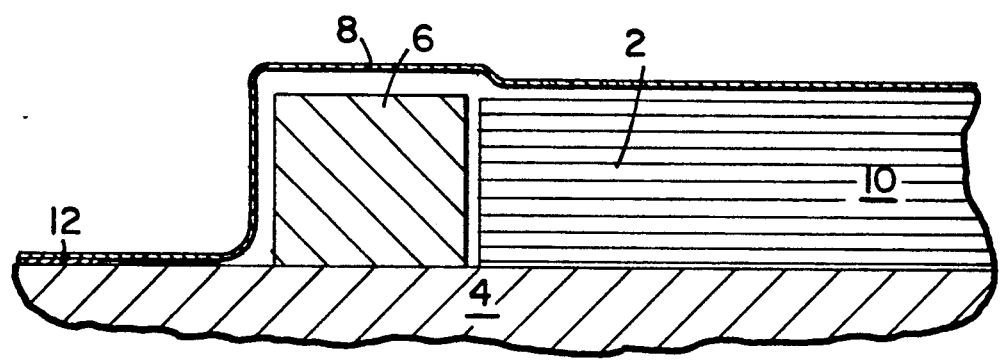

HIGH TEMPERATURE SEALANT CONTAINING PHENYL SILICONE

FIELD OF THE INVENTION

The invention relates to high temperature sealant compositions comprising phenyl silicone. In particular, the invention is directed to the use of a high temperature vacuum bag sealant tape comprising a phenyl silicone sealant in autoclave curing and processing of thermosetting and thermoplastic composites.

BACKGROUND OF THE INVENTION

High temperature sealants and adhesives are valuable industrial materials. There is a continuing search for materials which are useful at ever increasing temperatures and which maintain useful properties. For example, in autoclave curing and processing of thermosetting and thermoplastic composites, sheer strength, flexibility and thermal stability of the applied vacuum bag sealant are important characteristics. Generally, vacuum bag sealants have been based on butyl rubber and polydimethylsiloxanes. The use of these materials establishes a maximum processing temperature of about 650° to 700° F. Above these temperatures, these sealants degrade, char and lose their ability to maintain an airtight seal.

During this curing process, vacuum is periodically applied through a port in the vacuum bag. While vacuum is being applied, the vacuum bag sealant must maintain an airtight seal. In prior art processes, the sealant frequently fails before the end of the processing cycle, particularly when temperatures reach 700° F. and above. This results in a loss of vacuum in the vacuum bag and the composite part being made is then a total loss.

Phenylsiloxanes have been incorporated in pressure sensitive adhesives to attain useful adhesives to temperatures of less than about 550° F. For example, U.S. Pat. No. 3,032,438 to Gaynes, et al. discloses a pressure sensitive adhesive tape made from a backing material and two layers of a cured silicone. This is accomplished by applying a base layer of an adhesive consisting essentially of a silicone resin (an organo-silicone polymer identified as a mixture comprising principally methyl, phenyl, and methyl-phenyl polysiloxanes), about 0.5 to 5 parts by weight per 100 parts resin of a benzoyl peroxide curing agent and up to about 30 parts by weight per 100 parts resin of a filler such as hydrated alumina, titanium dioxide, zinc oxide, calcium carbonate, asbestos and similar materials, in a solvent such as toluol, heptane, xylene, or benzol to a fiberglass cloth backing. This layer is dried to drive off the solvent and subsequently coated with a second layer. The second layer is a solution of a silicone resin and from about 0.5 to about 5 parts of a curing agent consisting of tri-n-butylamine. The solvent is again driven off in an oven. The adhesive tape is then cured to provide a pressure sensitive adhesive tape effective for use within a temperature range of about $-110°$ to 550° F. Thus, Gaynes discloses a cured, pressure sensitive adhesive tape which is formed in a complicated, two-step process using solvent-based application of the adhesive. The resulting adhesive apparently would not be useful in autoclave operations at temperatures greater than 700° F.

U.S. Pat. No. 3,527,842 to Clark discloses a pressure sensitive adhesive useful for bonding films, such as polyamide films, to metal substrates, such as electrical conductors. The adhesive is a composition which consists essentially of (1) a methylphenylpolysiloxane resin, (2) a polysiloxane containing from 0.15 to 0.60 vinyl radicals per silicon atom, (3) a siloxane compatible with (1) and (2) having at least two SiH groups per molecule on the average, the remaining valences of the silicon atoms in the siloxane (3) being essentially all satisfied with aryl hydrocarbon and methyl radicals and SiOSi linkages, and (4) a catalyst for promoting the reaction between (2) and (3). This adhesive is apparently stable to a temperature of about 500° F. In sum, Clark discloses a pressure sensitive adhesive composition comprising a mixture of polysiloxane resins and a catalyst which promotes a cross linking reaction between two of the resins. The resulting adhesive apparently would not be useful in autoclave operations at temperatures greater than 700° F.

Accordingly, a substantial need exists for a polyorganosiloxane sealant or adhesive which is stable and which does not degrade or lose tack and adhesion at temperatures greater than about 700° F.

SUMMARY OF THE INVENTION

One aspect of the invention is a high temperature sealant composition which is useful in autoclave curing and processing of thermosetting and thermoplastic composites which comprises:
(a) about 40 to 90 wt-% of a silicone having a molecular weight of about 10,000 to 10,000,000 and repeating units comprising:
(i) about 1 to 20 mole-% of units having the formula:

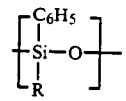

wherein R comprises —H, a $C_{1-5}$ alkyl group, a $C_{1-5}$ fluoroalkyl group, a vinyl group or a phenyl group and
(ii) about 99 to 80 mole-% of units having the formula:

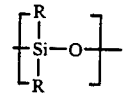

wherein each R independently comprises —H, a $C_{1-5}$ alkyl group, a $C_{1-5}$ fluoroalkyl group, a vinyl group, or a phenyl group; and
(b) about 1 to 10 wt-% of a thermal stabilizer;
(c) about 0.1 to 2 wt-% of a curing agent; and
(d) about 0 to 50 wt-% of an inorganic filler;
wherein the composition remains an effective sealant at temperatures above about 700° F. The sealant may be used to bond and seal a barrier film or vacuum bag to a forming tool in autoclave curing and processing of thermosetting and thermoplastic composites. When cured, the sealant exhibits excellent sheer strength and is useful at temperatures greater than about 700° F.

Another embodiment of the invention is a tacky high temperature sealant tape comprising a release-lined backing sheet having the above described sealant disposed on one surface thereof. The sealant tape may be cured to form a permanent bond which is effective at temperatures above about 700° F. The sealant composition may be extruded onto the backing sheet, thereby eliminating the need for solvents in the manufacture and use of this composition.

Yet another embodiment of the invention is a process for sealing a barrier film or vacuum bag to a shaped forming tool used in autoclave curing and processing of thermosetting and thermoplastic composites. The process comprises:

(a) arranging a laminate stack between the shaped forming tool and barrier film;
(b) placing an adhesive, non-porous sealant in intimate contact with the tool and barrier film, the sealant comprising:
   (i) about 40 to 90 wt-% of a silicone having a molecular weight of about 10,000 to 10,000,000 and repeating units comprising:
      (A) about 1 to 20 mole-% of units having the formula:

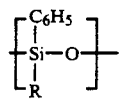

wherein R comprises —H, a $C_{1-5}$ alkyl group, a $C_{1-5}$ fluoroalkyl group, a vinyl group or a phenyl group and
      (B) about 99 to 80 mole-% of units having the formula:

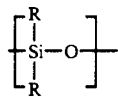

wherein each R independently comprises —H, a $C_{1-5}$ alkyl group, a $C_{1-5}$ fluoroalkyl group, a vinyl group, or a phenyl group; and
   (ii) about 1 to 10 wt-% of a thermal stabilizer;
   (iii) about 0.1 to 2 wt-% of a curing agent; and
   (iv) about 0 to 50 wt-% of an inorganic filler; and
(c) curing the laminate stack at elevated temperatures wherein the sealant cures and remains effective sealant at temperatures above about 700°

Using the sealant tape of the current invention allows one to hold a seal for longer periods of time at high temperature (700° F. and above) therefore allowing the processing cycle to be completed, and a satisfactory composite part results. The sealant of the current invention also allows one to go to higher temperatures than the prior art, therefore allowing processing of previously unprocessable materials.

The term "composite" as used here in the specification and claims, is meant to include the terms "laminate" and "prepreg", i.e., a single layer of uncured resin impregnated on a cloth.

BRIEF DESCRIPTION OF THE DRAWING

FIG. 1 is an exploded view of a portion of a lamination apparatus including the materials to be laminated.

DETAILED DESCRIPTION OF THE PREFERRED EMBODIMENT

Generally, in autoclave curing and processing of thermosetting and thermoplastic composites, a stack of laminating materials 2 are arranged on a forming tool 4. The laminating materials generally comprise a laminate stack (comprising the materials to be laminated and an adhesive), release films and fabrics, peel films, bleeder stacks, breather fabrics and optional caul plates. A dam 6 is placed adjacent to these materials on the forming tool 4, a barrier film or vacuum bag 8 is laid over the laminating materials and dam 6. The barrier film 8 and forming tool 4 thus define an interior volume 10. At least one conduit is arranged or formed to provide a passage between the interior volume 10 and a vacuum or a means to evacuate gases, and a sealant (e.g., an adhesive sealant tape) 12 is applied to the barrier film and forming tool to provide an airtight seal. The exterior of the barrier film 8 is subjected to elevated pressure while the interior volume 10 is evacuated, and the whole apparatus is subjected to elevated temperatures to cure a laminating stack which conforms to the shape of the forming tool. The process may be carried out in an autoclave. The arrangement of the laminating materials and general autoclave curing techniques are well known to those skilled in the art.

The laminating process of the invention may be carried out at temperatures higher than previously feasible due to the novel sealing material herein disclosed. Preferably, the sealing material is substantially organic solvent free. This provides for safer operation in autoclave curing processees. The process can also continue for a longer time as the sealing material is effective at elevated temperatures for longer periods of time than previous materials. Thus, the autoclave curing process of the invention can take place at temperatures greater than 700° F, more preferably about 700° to 800° F and most preferably about 750° F. The process may be carried out at pressures of about 15 to 300 psi, more preferably about 50 to 250 psi and most preferably about 200 psi. The autoclave cure process may continue for up to about 10 hours, more preferably about 2 to 6 hours, and most preferably about 4 hours.

The sealant is applied in an uncured state, and as the temperature is increased for the thermoforming process, the sealant curing agent catalyzes a cross linking reaction within the sealant composition, and the composition attains a high temperature resistant adhesive state.

As indicated above, the silicone resin has a molecular weight of about 10,000 to 10,000,000 and comprises repeating units comprising about 1 to 20 mole-% of units having the formula:

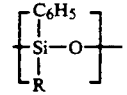

wherein R comprises —H, a $C_{1-5}$ alkyl group, a $C_{1-5}$ fluoroalkyl group, a vinyl group or a phenyl group; and about 99 to 80 mole-% of units having the formula:

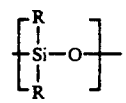

wherein each R independently comprises —H, a $C_{1-5}$ alkyl group, a $C_{1-5}$ fluoroalkyl group, a vinyl group, or a phenyl group. In other words, in each of the siloxane units, R is preferably independently hydrogen, $C_{1-5}$ alkyl, $C_{1-5}$ fluoroalkyl, vinyl or phenyl. Preferably, the silicone is at least about 1% phenyl substituted, i.e. the ratio of phenyl groups to silicon atoms is at least about 0.02 to 1. More preferably, the silicone is about 2 to 15% phenyl substituted, i.e. a phenyl to silicone ratio of about 0.04:1 to 0.3:1. This silicone may be combined with other components such as fillers to form a silicone composition. Representative ex of such silicone compositions include: SILASTIC ® LT-50 and SILASTIC ® LT-40 available from Dow Corning Corporation.

Preferably, the silicone composition incorporates sufficient filler incorporated so that it will not flow upon standing, allows for the incorporation of fillers and additives, is tacky at room temperature, and is at least 1% phenyl substituted. Thus, a preferred silicone composition comprises about 81 wt-% of a silicone having the general formula:

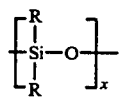

wherein R equals about 95% methyl and about 5% phenyl substituents and x is about 100 to 100,000, and about 19% of an inorganic silica based filler.

A thermal stabilizer is also added to the sealant composition. A representative, non-limiting list of such stabilizers include iron oxide, metallic powders such as aluminum and zinc, and compounds such as cerium hydrate and barium zirconate. Preferably the thermal stabilizer comprises iron oxide or cerium hydrate, and more preferably, it comprises iron oxide.

The curing agent used in the sealant composition serves to promote cross linking of the silicone resin. The polymerization embodies largely the cross linking of the silicone chains. At the same time, a minor amount of chain extension can occur. Generally, the cross linking occurs through the catalytic action of the curing agent upon the alkyl substituents of the polymeric silicone chain. Upon exposure to heat, the catalysts generate free radicals which activate the alkyl groups pendant to the Si-O-Si backbone by hydrogen removal. The resulting alkylene radicals are active sites for cross linking. Thus two of the active sites may combine to cross link polymeric chains. A representative, non-limiting list of potential curing agents include peroxides such as benzoyl peroxide, 2,4-dichlorobenzoyl peroxide, dicumyl peroxide, phthalic peroxide, chlorobenzoyl peroxide, acetyl benzoyl peroxide, cyclohexyl hydroperoxide, diacetyl peroxide, α,α'-bis(tbutylperoxy)diisopropyl benzene, t-butyl peroxybenzoate, t-butyl peroxyacetate, 1,1-bis(t-butylperoxy)-3,3,5trimethylcyclohexane, and 2,5-dimethyl-2,5-di(tbutylperoxy)hexane, and the like. Other cross linking agents may include tertiary butyl perbenzoate, metals such as zinc and platinum, and metal salts of carboxylic acid such as cobalt octoate, cobalt naphthenate, zinc octoate and zinc naphthenate. Preferably, the curing agent is a peroxide, and more preferably, the curing agent is dicumyl peroxide.

About 0 to 50 wt-% of a filler may also be incorporated into the sealant composition. A representative, nonlimiting limiting list of potential fillers includes hydrated alumina, titanium dioxide, zinc oxide, calcium carbonate, asbestos, silicas such as a fumed amorphous silica, other silicon compounds such as ground quartz and zirconium silicate, carbon black and diatomaceous earth. Preferably, the filler is ground quartz or fumed silica. More preferably, the filler is fumed amorphous silica.

The sealant composition may be applied on a release-lined backing sheet. The release liner may be any material which releasably adheres to the sealant composition of the present invention. A representative, non-limiting list of potential release liners includes fluorotreated kraft paper, polyester film such as MYLAR ™, polypropylene and polyethylene. Thus, the sealant composition may be applied to forming tool and the release liner removed to provide a second adhesive surface for adhering to a vacuum bag.

The sealant composition is prepared by mixing the silicone composition, thermal stabilizer(s), curing agent(s) and any additional fillers or extenders at low temperature (preferably less than 125° F.). The mixing can be done in a jacketed dual arm high shear mixer such as a Day mixer. This mixing is generally accomplished within 10–60 minutes. The sealant is preferably disposed on the release liner by extrusion at low temperature (preferably less than 125° F.). The resulting tape is tacky at room temperature. The sealant is applied between the barrier film and tool to create an airtight seal. The sealant remains in its uncured form until the temperature is raised to about 250° to 450° F. This preferably occurs during the heating of the material to be cured in an autoclave. The sealant becomes substantially crosslinked after a short period of time. The cure of the sealant begins at about 250° F., reaches its maximum rate at about 360° F. and is completed at about 450° F. The sealant/adhesive properties of the material before and after curing are given in Table I.

TABLE I

| Substrate | Cured*/Uncured | Shear Adhesion |
|---|---|---|
| Polyimide Film | Uncured | 5.5 psi |
| Polyimide Film | Cured | 8.6 psi |
| Aluminum Foil | Uncured | 6.2 psi |
| Aluminum Foil | Cured | Aluminum Foil Failure |

*Curing accomplished by ramping the temperature from room temperature to 500° F. in a one hour period, holding at 500° F. for one hour, and a one hour cool down to room temperature.

The shear adhesion testing was performed by laying down a strip of ¾" wide sealant tape on a flat surface and overlaying a strip of the substrate over the sealant tape so that there is a 1 square inch of overlap. The substrate was then tacked down to the sealant tape using finger pressure. For the cured specimens, this assembly was then run through the cure cycle described above. To obtain the shear adhesion value, a load was applied to the substrate horizontally to the overlap. The load at which the substrate separated from the tape was then recorded as the shear adhesion value.

EXAMPLES

The following specific examples which contain the best mode, can be used to further illustrate the invention. These examples are merely illustrative of the invention and do not limit in scope.

EXAMPLE 1

95 parts of SILASTIC ® LT-40 (a mixture of 81% of a methylphenylsiloxane containing 95 mole-% methyl groups and 5 mole-% phenyl groups along the backbone and 19% amorphous silica filler), 4 parts of iron oxide and 1 part of dicumylperoxide were mixed using a small Brabender mixing head for approximately 10 minutes. The sealant composition was extruded into a ¾"×⅛" tape onto fluorotreated 50 lb. bleached kraft paper using the single screw extruder attachment to the Brabender. This sealant composition had excellent tack.

EXAMPLE 2

In the same manner Ex , a sealant composition containing 95 parts of SILASTIC® LT-50 (a mixture of 78% of a methylphenylsiloxane containing 95 mole-% methyl groups and 5 mole-% phenyl groups along the backbone and 22% amorphous silica filler), 4 parts of iron oxide and 1 part of dicumylperoxide was prepared. This sealant composition had light tack.

EXAMPLE 3

In the same manner as Example 1, a sealant composition containing 47.5 parts of a mixture of 78% of a methylphenylsiloxane containing 95 mole-% methyl groups and 5 mole-% phenyl groups along the backbone and 22% amorphous silica filler, 47.5 parts of a mixture of 81% of a methylphenylsiloxane containing 95 mole-% methyl groups and 5 mole-% phenyl groups along the backbone and 19% amorphous silica filler, 4 parts of iron oxide and 1 part of dicumylperoxide was prepared. This sealant composition had moderate tack.

EXAMPLE 4

The sealant composition of Example 1 was compared to FRTL-5012. FRTL-5012 is a commercial high temperature vacuum bag sealant tape which contains 55 parts of polydimethylsiloxane, 40 parts of silica based fillers, 4 parts of iron oxide and 1 part of dicumyl peroxide. The materials were heated in an oven to a given temperature, held for one hour at that temperature, and then cooled to room temperature. The tensile strength and elongation were then measured per ASTM D-638. The results are in Table II.

TABLE II

| Material | Temperature (°F.) | Tensile Strength | Elongation |
|---|---|---|---|
| FRTL-5012 | 500 | 178 psi | 1088% |
| FRTL-5012 | 700 | 34 psi | 211% |
| FRTL-5012 | 750 | 17 psi | 135% |
| FRTL-5012 | 800 | ** | ** |
| Example 1 | 500 | 276 psi | 1008% |
| Example 1 | 700 | 172 psi | 674% |
| Example 1 | 750 | 128 psi | 631% |
| Example 1 | 800 | 64 psi | 239% |

**Specimens could not be prepared because the material was too badly destroyed.

Tensile strength and elongation are properties which are very important to any sealant. The sealant must not only be strong (tensile strength) it must also have the ability to be stretched (elongation). Using a moderate exposure to 500° F., the sealant composition from Example 1 has a higher tensile strength and comparable elongation to FRTL-5012. Upon exposure to temperatures of 700°-800° F., the sealant of Example 1 is vastly superior to FRTL-5012 at every temperature. In fact, the Example 1 sealant has a higher tensile strength and elongation after exposure to 800° F. than FRTL-5012 has after exposure to 700° F. This demonstrates the increased temperature resistance of the Example 1 sealant.

EXAMPLE 5

The sealant tape from Example 1, FRTL-5012, and Schnee-Morehead 5158 (a commercial high temperature vacuum bag sealant tape containing 67 parts polydimethylsiloxane, 28.4 parts silica based filler, 3.6 parts iron oxide and 1 part dicumylperoxide) were compared via thermogravimetric analysis (TGA). The materials were heated to 700° F. at a rate of 18° F./minute and then held at that temperature for 10 hours in an air atmosphere. The weight loss versus time curve was then obtained for each experiment. After adjusting for the amount of silicone based polymer in each sealant, the times to 5% and 10% polymer loss were determined. The results are in Table III.

TABLE III

| Material | Temperature | Time to Polymer Wt. Loss (Min) 5% | 10% |
|---|---|---|---|
| SM 5158 | 700° F. | 50 | 71 |
| FRTL-5012 | 700° F. | 46 | 61 |
| Ex. 1 | 700° F. | 58 | 94 |

This example shows that the sealant of Example 1 loses weight at a slower rate than the commercial sealants. This phenomenon should allow it to retain its strength for longer periods of time at a given temperature.

EXAMPLE 6

In the same manner as Example 1, a sealant composition containing 93 parts of a mixture of 81% of a methylphenylsiloxane containing 95 mole-% methyl groups and 5 mole-% phenyl groups along the backbone and 19% amorphous silica filler, 6 parts of iron oxide and 1 part of dicumylperoxide was prepared. This sealant composition had excellent tack. The TGA of the Examples 1 and 6 sealants were compared by isothermally heating at 700° F. in air for 10 hours. The times to 5 and 10% polymer weight loss were recorded in Table IV.

TABLE IV

| Material | Temperature | Time to Polymer Wt. Loss (Min) 5% | 10% |
|---|---|---|---|
| Ex. 1 | 700° F. | 58 | 94 |
| Ex. 6 | 700° F. | 54 | 91 |

This comparison shows that the addition of thermal stabilizer (iron oxide) beyond the 4% used in Example 1 is unnecessary.

The foregoing description, examples and data are illustrative of the invention described herein, and they should not be used to unduly limit the scope of the invention or the claims. Since many embodiments and variations can be made while remaining within the spirit and scope of the invention, the invention resides wholly in the claims herein after appended.

What is claimed is:

1. A high temperature sealant composition, useful in autoclave curing and processing of thermosetting and thermoplastic composites, comprising:
   (a) about 40 to 90 wt-% of a silicone having a molecular weight of about 10,000 to 10,000,000 and repeating units comprising:
   (i) about 1 to 20 mole-% of units having the formula:

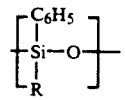

wherein R comprises —H, a $C_{1-5}$ alkyl group, a $C_{1-5}$ fluoroalkyl group, a vinyl group or a phenyl group and (ii) about 99 to 80 mole-% of units having the formula:

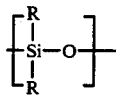

wherein each R independently comprises —H, a $C_{1-5}$ alkyl group, a $C_{1-5}$ fluoroalkyl group, or a vinyl group; and (b) about 1 to 10 wt-% of a thermal stabilizer;

(c) about 0.1 to 2 wt-% of a peroxide curing agent that acts upon alkyl substituents on the silicone chain resulting in alkylene groups that combine to croslink; and (d) about 0 to 50 wt-% of an inorganic filler;

wherein the composition is semisolid, exhibits tack prior to cure and remains an effective sealant at temperatures above about 700° F.

2. The sealant composition of claim 1 wherein the silicone is about 2 to 15% phenyl substituted.

3. The sealant composition of claim 1 wherein the stabilizer is selected from the group consisting of iron oxide, cerium hydrte, barium zirconate and a mixture thereof.

4. The sealant composition of claim 1 wherein the curing agent is selected from the group consisting of dicumylpeoxide, α,α'-bis(t-butylperoxy) diisopropyl benzene, benzoyl peroxide and a mixture thereof.

5. The sealant composition of claim 1 wherein the inorganic filler is selected from the group consisting of a silica, diatomaceous earth, ground quartz and a mixture thereof.

6. The sealant composition of claim 1 which is substantially organic solvent-free.

7. A high temperature sealant tape, useful in autoclave curing and processing of thermosetting and thermopalstic composites, comprising:

(a) a release liner;

(b) a semisolid sealant disposed on the release liner which sealant comprises:

(i) about 40 to 90 wt-% of a silicone having a molecular weight of about 10,000 to 10,000,000 and repeating units comprising:

(a) about 1 to 20 mole-% of units having the formula

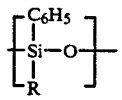

wherein R comprises —H, a $C_{1-5}$ alkyl group, a $C_{1-5}$ fluoroalkyl group, a vinyl group or a phenyl group and (B) about 99 to 80 mole-% of units having the formula:

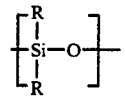

wherein each R independently comprises —H, a $C_{1-5}$ alkyl group, a $C_{1-5}$ fluoroalkyl group, or a vinyl group; and (ii) about 1 to 10 wt-% of a thermal stabilizer;

(iii) about 0.1 to 2 wt-% of a peroxide curing agent that acts upon alkyl substituents on the silicone chain resulting in alkylene groups that combine to crosslink; and (iv) about 0 to 50 wt-% of an inorganic filler;

wherein the tape remains effective at temperatures above about 700° F.

8. The tape of claim 7 wherein the release liner is selected from the group consisting of fluorotreated kraft paper, polyester, polypropylene, polyethylene and a mixture thereof.

9. The tape of claim 7 wherein the silicone is about 2 to 15% phenyl substituted.

10. The tape of claim 7 wherein the stabilizer is selected from the group consisting of iron oxide, cerium hydrate, barium zirconate and a mixture thereof.

11. The tape of claim 7 wherein the inorganic filler is selected from the group consisting of a silica, diatomaceous earth, ground quartz and a mixture thereof.

12. The tape of claim 7 which is substantially organic solvent-free.

13. An organic solvent-free high temperature sealant tape, useful in vacuum thermoforming, comprising:

(a) a release liner;

(b) a semisolid sealant disposed on the release liner, which sealant comprises.

(i) about 95 Wt-% of a composition comprising about 81 wt-% of a silicone having the general formula

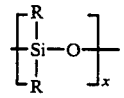

wherein R equals about 95% methyl and about 5% phenyl substituents and x is about 100 to 100,000, and about 19% of an inorganic silica based filler;

(ii) about 4 wt-% of an iron oxide thermal stabilizer; and (iii) about 1 wt-% of a dicumyl peroxide curing agent that acts upon alkyl substituents on the silicone chain resulting in alkylene groups that combine to crosslink;

wherein the tape remains effective at temperatures above about 700° F. and exhibits room temperature tack.

* * * * *